Figure 5:
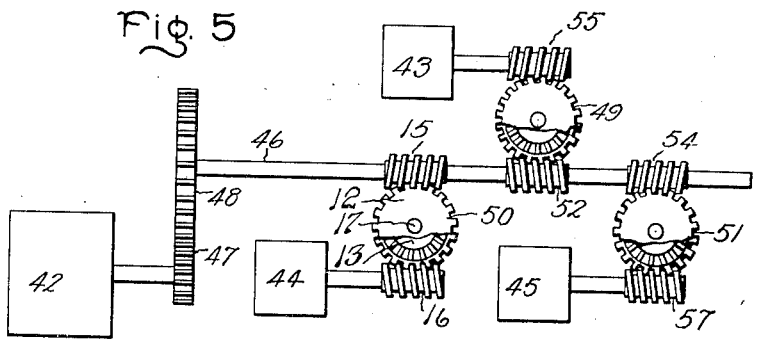

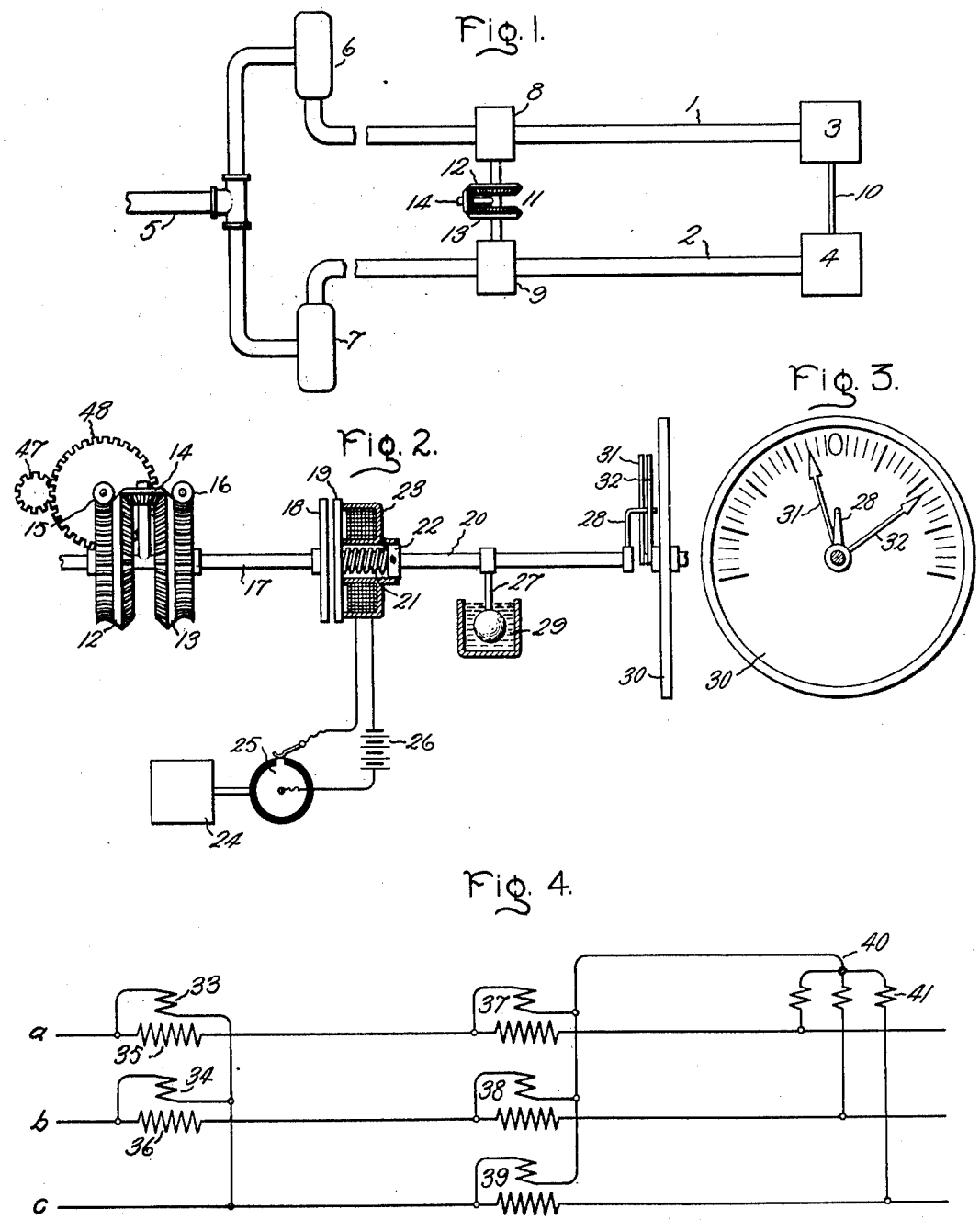

Dec. 22, 1925. 1,566,879
V. KARAPETOFF
METERING SYSTEM
Filed March 7, 1922   3 Sheets-Sheet 2

Inventor:
Vladimir Karapetoff,
by Albert G. Davis
His Attorney.

Patented Dec. 22, 1925.

1,566,879

BEST AVAILABLE COPY

UNITED STATES PATENT OFFICE.

VLADIMIR KARAPETOFF, OF ITHACA, NEW YORK, ASSIGNOR TO GENERAL ELECTRIC COMPANY, A CORPORATION OF NEW YORK.

METERING SYSTEM.

Application filed March 7, 1922. Serial No. 541,842.

*To all whom it may concern:*

Be it known that I, VLADIMIR KARAPETOFF, a citizen of the United States, residing at Ithaca, county of Tompkins, State of New York, have invented certain new and useful Improvements in Metering Systems, of which the following is a specification.

My invention relates to metering systems and has for its object the determination and measurement of unbalanced conditions in multiple line supply systems. A more specific object of my invention is the measurement of unbalanced conditions in polyphase electric lines. A further object of my invention is the provision of means for indicating the maximum demand of an unbalanced quantity in a multiple line or circuit. Other advantages of my invention will appear as the description proceeds.

When a medium such as oil, gas, electricity, etc., is transferred from one point to another over a multiple line system it is desirable that the system shall remain balanced, that is to say that each line will carry its proportionate share of the medium. This is particularly important in the transmission of electric energy over a polyphase circuit. It often happens however that the polyphase circuit, for example, becomes unbalanced and it is then desirable to measure the degree of unbalancing in order that the same may be corrected, or if the circuit is one supplying energy to customers, that a proper increase in the revenue rate may be charged for unbalanced energy. In the case of polyphase alternating current circuits a customer who draws a large unbalanced load from an otherwise well balanced system should be charged a higher rate than a customer who draws a balanced load from the same system. Moreover if the first mentioned customer's load is one of low power factor, his rate should be still further increased because of the well known detrimental effects of such loads on an otherwise well balanced polyphase system as well as the necessity of increasing the capacity of the line and generating apparatus in order to take care of unbalanced overloading. The capacity of the line and supply apparatus must be such as to supply the maximum demand and it is thus desirable that a metering system be provided capable of measuring maximum demand of unbalanced loads of any power factor. Although my invention is particularly useful for the metering of alternating-current polyphase circuits, it is also capable of application to the Edison three-wire direct-current system or to multiple-line systems supplying any other medium capable of being metered, such, for example, as oil, water, gas, etc. In carrying my invention into effect I provide in one instance means for measuring the flow of medium in each line of the supply system, means for measuring the total flow of medium supplied, and differential means for comparing the flow in any line with the total such that any unbalancing will be indicated and its amount measured.

Figure 6:
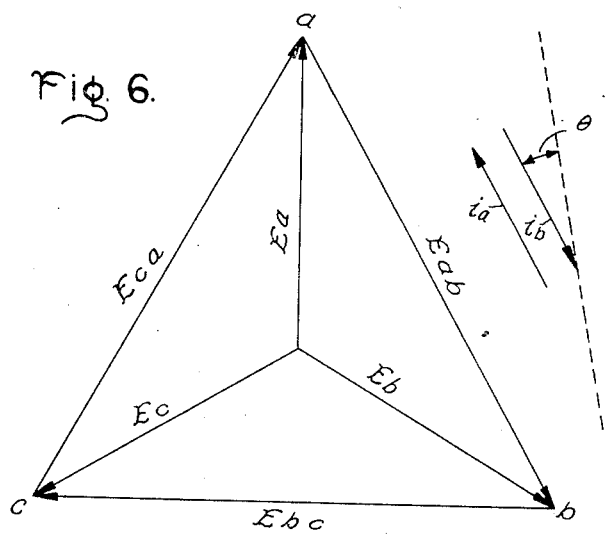
Figure 7:
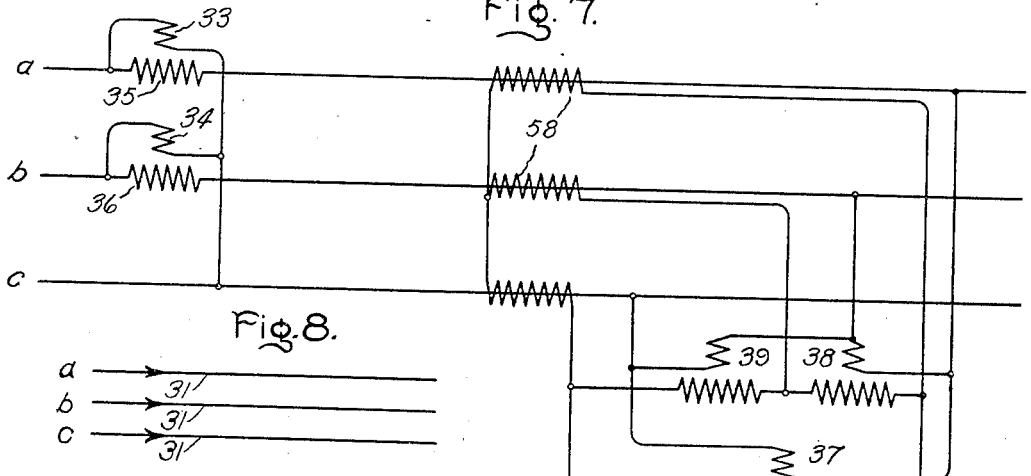
Figure 8:
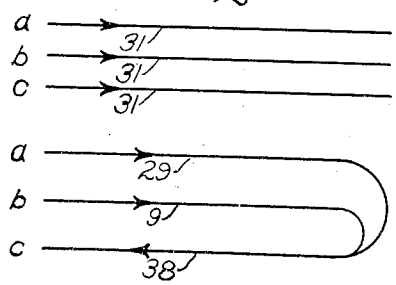
Figure 9:
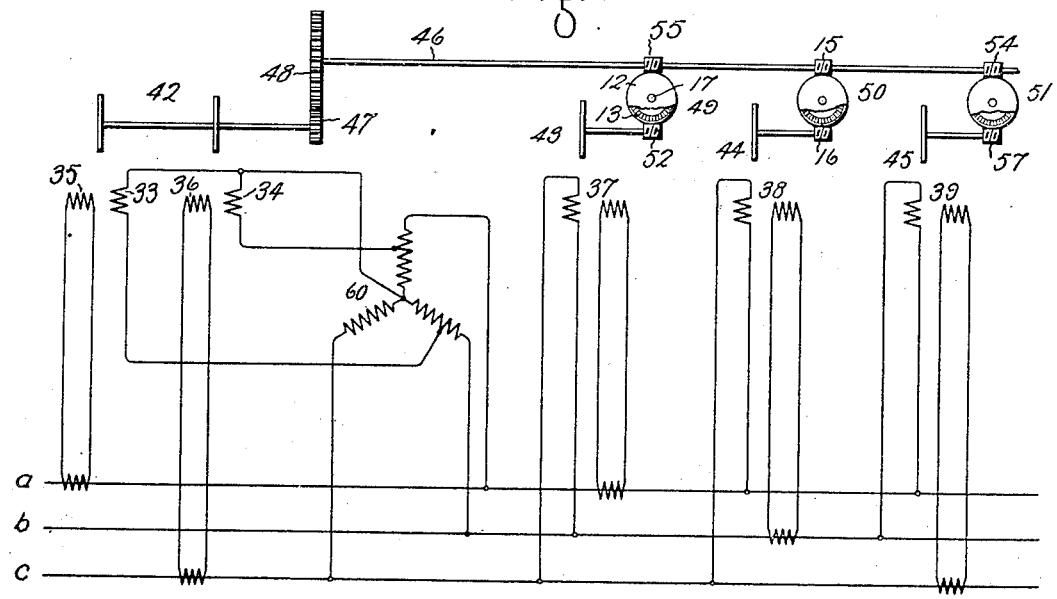

The particular features of my invention which I believe to be novel and patentable will be pointed out in the claims appended hereto. The preferred manner of operating my system and the apparatus for carrying it into effect will be explained in connection with the accompanying drawings in which Fig. 1 shows a simplified form of my invention applied to a two-pipe supply system; Fig. 2 shows one type of differential maximum demand indicator which may be used in my invention; Fig. 3 shows a face view of the indicating dial used with the apparatus of Fig. 2; Figs. 4 and 7 show methods for connecting electric meters on a three-phase circuit when used with my invention; Fig. 5 diagrammatically illustrates one method of mechanically connecting such meters, Fig. 6 is a vector diagram illustrative of a three-phase electric system, Fig. 8 is a diagrammatic illustration of what is hereinafter referred to as "unbalanced circulating power" and Fig. 9 is a diagrammatic layout of the preferred modification of my invention.

Referring now to Fig. 1, 1 and 2 represent a pair of pipes through which oil or any other fluid is respectively supplied to consuming devices 3 and 4. The fluid is drawn through pipe 5 from a source not shown, by means of pumps 6 and 7. Meters 8 and 9 are provided for measuring the flow of fluid in pipes 1 and 2 respectively. These meters are preferably provided with integrating devices so that by adding the two readings either automatically or mentally, the total amount of fluid supplied may be obtained. Let us assume that the pipe lines are of considerable length, say, for example, several miles. Under these conditions it is desirable that the amount of fluid supplied by the two pipes, assuming them to be of equal diameter, should be equal. For, if the normal capacity of each pipe is 200 gallons per minute and pipes 1 and 2 are called upon to deliver 50 gallons and 250 gallons per minute respectively, then pump 9 will be considerably overloaded, the pressure at 4 will be much below normal and the loss in pipe 2 considerable. Thus a very undesirable condition of unbalancing may occur and in order that the customer may correct this condition, such for example, as by a transfer pipe 10 or the provision of suitable storage tanks, or else be charged a greater rate for his oil, I provide a differential 11 between meters 8 and 9 arranged to indicate or record unbalanced conditions. This differential will preferably have its two sides driven in opposite directions by the meters 8 and 9 in any suitable manner so that when the flow of oil is equal in both pipe lines 1 and 2, the center 14 of the differential will remain stationary, and when the flow of oil is unbalanced in the two pipes the central element 14 will be turned in one direction or the other, thus indicating through suitable pointers or integrating mechanisms the direction and extent of unbalancing.

In Figs. 2 and 3 I show one arrangement of a differential by means of which the maximum demand of unbalancing may be indicated. In Fig. 2 I show the two sides 12 and 13 of a differential driven through worm gears 15 and 16 respectively. In a two-line supply system such as shown in Fig. 1, gears 15 and 16 will preferably be driven by the single line meters 8 and 9 respectively. The central element 14 of the differential is connected through shaft 17 to a disc 18 which serves as one member of a friction clutch. The other member of the clutch consists of a disc 19 secured to a sleeve which is slidably but non-rotatably mounted on a shaft 20. Normally the disc 19 is pressed against co-operating disc 18 by means of a spring 21 compressed between disc 19 and a collar 22 secured to shaft 20. Disc 19 also constitutes the armature of an electromagnet 23. Electromagnet 23 is suitably secured to collar 22 and turns with shaft 20. A timing device 24 which may be a clock or a constant speed electric motor rotates a contact device 25 which is inserted in the circuit of the electromagnet 23 and a battery or other source of supply 26 for energizing the electromagnet. Thus once during each revolution of contact device 25 the circuit of the electromagnet will be closed and the disc armature 19 will be drawn to its seat on electromagnet 23 thereby disengaging shaft 20 from shaft 17. The parts are illustrated with the electromagnet energized. Shaft 20 is freely rotatable and carries in addition to the clutch mechanism an eccentric weight 27 and a dog 28. The purpose of weight 27 is to return shaft 20 and the parts carried thereby to an initial or zero position when said shaft is disengaged from shaft 17 by the operation of the electromagnet. In order to prevent shaft 20 from oscillating due to the pendulum effect of weight 27 when the shaft is released, I provide an oil bath 29 in which weight 27 swings. It will thus quickly return to its lowest position without undue oscillation. Instead of a weight I might use a spring for this purpose. Dog 28 is shown mounted on the free end of shaft 20 opposite a stationary dial 30 and when weight 27 has returned shaft 20 and the parts carried thereby to the normal position illustrated, dog 28 stands at zero with respect to a pair of graduated scales on dial 30, one scale reading to the right and the other to the left of the zero point which is shown in a position corresponding to 12 o'clock on a clock dial. Frictionally mounted at the center of dial 30 and in the path of movement of dog 28 are a pair of pointers 31 and 32. The arm of dog 28 is inserted between these pointers so that if the dog is rotated to the right by the differential, pointer 32 will be moved away from zero to the right, and if dog 28 is moved to the left, pointer 31 will be moved to the left a corresponding amount. The pointers will stay in any position to which they have been moved and will thus indicate the maximum amount of rotation in either direction of dog 28 in any time interval as determined by the timing device 24. When the apparatus shown in Figs. 2 and 3 is used with the meters shown in Fig. 1, its operation may be explained as follows:—initially pointers 31 and 32 will be moved against dog 28 in the zero position. If the flow of oil in both pipes 1 and 2 remain equal, gears 12 and 13 will be rotated at the same speed in opposite directions and there will be no rotation of the differential element 14. Consequently, there will be no rotation of either the pointers 31 or 32. Now suppose the flow in the pipes is changed so that 210 gallons per minute flows in pipe 2 and 100 gallons per minute flows in pipe 1. The average flow per pipe or what each pipe should be carrying is $$\frac{210+100}{2}=155$$

gallons per minute and the difference between the average amount and what each pipe is actually carrying equals 55 gallons per minute and constitutes what is hereinafter called the amount of circulating unbalancing. Under these conditions element 14 of the differential will be rotated say in a direction to move dog 28 to the right. Now if the timing device 24 is adjusted to close the circuit of electromagnet 23 once a minute, then the differential will drive pointer 32, through dog 28, shaft 20, clutch 18, 19 and shaft 17 for one minute to the right. At the end of one minute electromagnet 23 will be energized, shaft 20 will be disengaged from shaft 17 and weight 27, which has just been moved from its normal position, will return shaft 20 and the parts carried thereby back to the zero position. Pointer 32 will remain in the position to which it has been moved unless a greater unbalancing in the same direction occurs in which case it will be moved still further. Now let us assume that the quantity of oil supplied by pipes 1 and 2 is changed so that pipe 1 carries 200 gallons per minute and pipe 2 170 gallons per minute, causing a circulating unbalancing of $$\frac{200+170}{2} - 170 = 15$$

gallons per minute. Under these conditions the central element of the differential will be moved in the opposite direction and dog 28 will move pointer 31 to the left an amount proportional to the new unbalanced condition. If no greater unbalancing occurs in either direction the pointers 31 and 32 will remain in these positions until the end of the month when a reading is taken and the pointers reset to zero. If each division of the scale represents a circulating unbalanced flow of 5 gallons per minute, the position of the pointers shown in Fig. 3 indicates that during the preceding month a circulating unbalancing of 55 gallons per minute occurs in one direction and 15 gallons per minute in the other direction. Since the meters together measure the total flow, the differential arrangement constitutes a method of comparing the flow in any line with the average flow or the total divided by the number of lines. If desirable, a pair of integrating devices may be arranged to be driven, one by the right hand rotation and the other by the left hand rotation, of shaft 17 to integrate the unbalanced flow in both directions during the month.

A device suitable for this purpose is described and illustrated in United States Patent No. 1,267,198, Evans.

In certain cases provision may be made for returning unused fluid from the customer to the source of supply over the supply lines, in which case one or both of the meters 8 and 9 of Fig. 1 will be rotated backward and conditions might arise where fluid will be flowing from the source of supply in one pipe and a portion of the same returned over another pipe. This very undesirable unbalanced condition will be indicated by the differential arrangement and the penalty increased proportionately although the customer will be credited for the return of unused fluid due to the decrease in the reading of the totalizing meter.

I will now explain the application of my invention to the metering of the circulating power or energy in an unbalanced three-phase alternating current system.

In Fig. 4 I have shown a well known method of connecting watt meters in a three-phase circuit so as to measure the total power and the power in each phase separately. Thus, 33 and 34 represent the voltage coils and 35 and 36 the current coils of a three-phase watt meter connected to measure the total power in the three-phase system $a$, $b$, $c$. 37, 38 and 39 represent the coils of single phase watt meters connected to measure the power in phases $a$, $b$ and $c$ respectively. The potential circuit of the three single phase watt meters are connected between the respective phases and an artificial neutral 40 formed in the usual manner by three identical reactive coils 41 connected in Y to the three phases of the system. As thus connected, the polyphase watt meter will measure the total power flowing in the system and the three single phase watt meters will measure the power flowing in each of the respective phases. These watt meters are preferably of the integrating type. In Fig. 5 I show the preferred manner of mechanically interconnecting the rotative elements of the four watt meters so as to indicate unbalanced conditions in the system to which they are connected. Thus, 42 indicates the polyphase watt meter and 43, 44 and 45 the three single phase watt meters. The polyphase watt meter 42 is geared to a shaft 46 through a 3 to 1 reduction composed of gears 47 and 48. Shaft 46 drives one side of three differentials diagrammatically illustrated at 49, 50 and 51 through worm gears 52, 53 and 54 respectively. The other sides of the differentials are driven by the three single phase watt meters 43, 44 and 45 through worm gears 55, 56 and 57 respectively. Each one of these differentials may be similar to the differential shown in Fig. 2 and in the last mentioned figure I have represented one side of the differential as driven through a 3 to 1 reduction gear 47, 48 corresponding to the driving connection of the polyphase watt meter 42 to the shaft 46 in Fig. 5. As thus connected, when the power of the three-phase system is balanced, watt meter 42 will rotate three times faster than the single phase watt meters and will drive shaft 46 at the same speed as the shafts of the single phase watt meters. The two sides of each differential will be driven in opposite directions and the central elements will remain stationary. Now, let us assume a steady unbalanced load on the three-phase circuit, such for example, that the three phases carry 60, 40 and —7 kilowatts respectively. Watt meter 42 will measure the total power or 93 kilowatts. The average power per phase is 31 kilowatts. The difference between the average power per phase and the actual power per phase will be 29, 9 and 38=29+9 kilowatts. Thus in Fig. 5 shaft 46 will be rotated at a speed corresponding to 31 kilowatts and the three single phase meters will be rotated at a speed corresponding to 60, 40 and —7 kilowatts respectively and the three differentials will be recording unbalanced circulating power equal to 29, 9 and 38 kilowatts respectively. The single phase watt meter in the phase carrying the —7 kilowatts will have its direction of rotation reversed and its differential will record the total unbalanced circulating power of 38 kilowatts while the other two differentials will record its components of 29 and 9 kilowatts respectively. The unbalanced flow is equivalent to a superposition of a balanced flow of 31 kw., and two "circulations" equal to 29 and 9 respectively such as is diagrammatically illustrated in Fig. 8.

The differential recording gears may be provided with any well known type of integrating device if it is desirable to integrate unbalanced power and should also be provided with maximum demand attachments such as shown, for example, in Fig. 2, as otherwise the customer may balance the integrated reading within the month by judiciously transferring his unbalanced load from phase to phase and thus escape the penalty. A maximum demand attachment of any of several known kinds may be used which will register an unbalancing over a specified time interval, say, from five to thirty minutes, and the indications cannot be reduced by a subsequent unbalancing in the opposite direction. The polyphase watt meter will of course be provided with an integrating attachment and if desirable a maximum demand attachment. At the end of each month the greatest of the indications on the maximum demand dials measuring unbalanced energy is to be taken as the maximum circulating power caused. The customer will be charged for power actually used as determined from the three-phase watt meter readings and penalized for circulating unbalanced power in accordance with the maximum demand reading computed in accordance with an agreed rate.

Referring now to Fig. 2 which may represent one of the three differential maximum demand indicators dagrammatically represented in Fig. 5. The timing device 24, 25 may serve for each of three maximum demand attachments. The dial 30 will be calibrated in kilowatts, one pointer representing an unbalanced condition above normal and the other pointer representing an unbalanced condition below noraml. When used with a three-phase system, we would have three such dials each equipped with two pointers. Each dial will show the direction and extent of the maximum unbalanced condition which has occurred in its corresponding phase since the pointers were last read and set back to zero.

When there are only two circuits to be measured such as would be the case with a quarter-phase system or with the Edison three-wire direct current system, the differential arrangement shown in Fig. 1 is preferable. However, it is evident that such systems and likewise the two-pipe coil system of Fig. 1 might be provided with a metering system in which a shaft is driven by a totalizing meter at one-half speed and have two differentials connected thereto, the opposite sides of which are driven by meters in each of the two lines or circuits. Similarly, a system of any number of lines or phases such as a five-line or a five-phase system, may be equipped with a totalizing meter driving a shaft through a 5 to 1 reduction gear driving one side of five differentials the opposite sides of which are driven by meters in each of the five lines or phases for recording unbalanced conditions. Instead of using a reduction gear between the totalizing meter and differentials, the totalizing meter might be adjusted to run at the same speed with the single line meters under balanced conditions.

Wattless energy may be treated in a similar manner and a diagrammatic layout therefor is shown in Fig. 9 where the various parts are designated by the reference numerals previously used and where the lines $a$, $b$, $c$, are considered to be a continuation of lines $a$, $b$, $c$, of Figs. 4 or 7. A polyphase reactive kilowatt hour meter is simply an ordinary polyphase meter with its potential circuits connected to sources of voltage in quadrature with those used for measuring the true energy. Thus, referring to Fig. 4, one of the potential circuits of the polyphase watt hour meter measuring the true energy is connected across the voltage $Eca$, Fig. 6. The reactive material carrying the same line current $a$ would be connected across the Y voltage $Eb$ in quadrature with $Eca$ and the ratio of the potential transformer or the meter constant changed accordingly. Similarly, the potential winding connected across $Ebc$ would be connected across $Ea$ in quadrature with it. A reactance for obtaining suitable star voltages for the polyphase meter 42 is represented at 60 in Fig. 9. The single phase meters are reconnected accordingly, each Y voltage being replaced by a line voltage in quadrature with it, as represented in Fig. 9 and the change in the magnitude of the voltage being taken care of by changing the ratio of the potential transformers or meter constants. Thus, if the customer is to be charged an extra amount for causing reactive currents in the system, and also penalized for unbalanced reactive currents, additional meters have to be installed arranged as in Fig. 9 with the potential windings connected to quadrature sources of voltage, as explained above. Such meters will run in one direction or the other, according to whether a lagging or a leading current is taken, and suitable devices may be provided to indicate the direction and extent of such rotation. The agreed rate may be different in the two cases, or the customer may be even given credit for taking a leading current. The indications obtained by two sets of meters, one measuring reactive power and the other measuring true power, afford quite a complete analysis of the character of the service rendered and show the customer where he can reduce the cost of service and the power company where it can rearrange various customers' loads on its system in order to more nearly balance the latter.

Let us assume an extreme case of a single phase load taken from a three-phase line. Let a steady single phase non-inductive load of P watts be connected between the line conductors $a$ and $b$, the phase $c$ being open, (Fig. 4). The current in the line wires $a$ and $b$ are equal and opposite, and are indicated in Fig. 6 by vectors $ia$ and $ib$ in phase with the voltage $Eab$. The single phase watt meters in phases $a$ and $b$ will each read the amount $$P/2 = Ei/2 = ei \cos 30° = ei\sqrt{3}/2,$$

where E is the delta voltage and $e$ is the Y voltage. This single phase power may be resolved for the purpose of illustration into a balanced three-phase power of $P/3$ watts per phase, and such circulating power as to give the actual power in the three phases equal to $P/2$, $P/2$ and zero respectively. Thus the circulating power as recorded by the three differentials is $P/6$ in phase $a$, $P/6$ in phase $b$ and $-P/3$ in phase $c$, the maximum circulating power being $P/3$ or 1/3 the total power P.

If the single phase load is partially inductive the two watt meter readings will be different from each other although their algebraic sum is always equal to the true power consumed. In Fig. 6, let the current vector $ia$ and $ib$ be now drawn at an angle $\varnothing$ to $Eab$, as indicated by the dotted line, instead of being parallel to it. The two watt meters will read the amount $ei$ cos (30−$\varnothing$) and $ei$ cos (30+$\varnothing$) respectively the sum being equal to $$ei \cos \phi \sqrt{3} \text{ or to } Ei \cos \phi,$$

which is the power consumed in the load.

The single phase meter readings and the amount of circulating power read from the maximum reading differential for which the customer is to be penalized at various values of power factor of the load is illustrated by the following numerical example in which the total power is taken as 120 kilowatts and the average power per phase 40 kilowatts.

| $\phi$ | Power factor or cos $\phi$. | Single phase watt meter readings. | | | Circulating power. |
|---|---|---|---|---|---|
| 0 | 1. | 60 | 60 | 0 | 40 |
| 30° | .886 | 80 | 40 | 0 | 40 |
| 60° | .50 | 120 | 0 | 0 | 80 |

Below .5 power factor one of the watt meters will reverse and the circulating power will increase rapidly. Thus at some power factor below .5 the watt meter readings will be 150, −30 and zero and the circulating power will be 110 kilowatts. The largest difference between the average power and the actual readings is taken as the circulating power for which the customer is to be penalized. This rapid increase in penalty at very low values of power factor is fully justified, since a customer who draws a large single phase reactive current from a well managed three-phase system causes a very undesirable line condition not only for the power company but for other customers on the same line as well.

The foregoing example gives only part of the total penalty incurred on a single phase load. The corresponding indications of the reactive power meters should also be considered. Thus, when the watt hour readings are according to $\varnothing=30°$, the reactive readings will correspond to those given for $\varnothing=60°$. With the assumed connections of the reactive component meters, there will be some penalty for circulating reactive power even on a non-inductive single phase load. Such a penalty is only reasonable to expect, since the individual phase windings in the armature of an alternator are magnetically interlinked, and a single phase load, even though non-inductive, produces an undesirable armature reaction. Moreover, a single phase load is liable to unbalance the three voltages at the terminals of other customers and thus cause additional reactive energy in the system. As soon as a load becomes unbalanced, the resulting circulating energy can be fully measured only by two sets of meters, the potential windings of one set being connected to a combination of voltages in quadrature with those of the other set. An unbalanced load may be non-inductive in so far as each phase separately is concerned, but with regard to the whole symmetrical three-phase system such a load requires a certain amount of reactive as well as true circulating energy.

Instead of connecting the three single phase meters in Y, as in Fig. 4, they can also be connected in delta through current transformers 58 as illustrated in Fig. 7. The three-phase watt meter will be connected the same as in Fig. 4 and the three single phase watt meters will be connected as indicated at 37, 38 and 39, (Fig. 7) respectively. As thus connected, at a balanced load the meters will run at the same speed. With an unbalanced load they can be made to show the circulating energy by connecting them mechanically to the totalizing watt meter as in Fig. 5. The reactive component meters may be similarly connected. By means of suitably arranged potential transformers, three quadrature voltages can be obtained without using the voltages to the neutral.

Although I have illustrated only one general method of comparing the totalizing meter with the single line meters I do not wish to be limited thereto as other methods of accomplishing this comparison and other types of differentials applicable thereto will suggest themselves to those skilled in the art.

It has been assumed in the foregoing description that the individual lines of each multiple line system were designed to carry the same amount of the medium conveyed. Cases may occur where individual lines of a multiple line system are not of equal carrying capacity but have been designed to meet special conditions. My invention may be applicable to such systems by suitably proportioning the speed ratio between the individual line meters and their respective differentials, so that when each line is carrying the proportion of the load for which it has been designed there will be no differential indication of unbalancing.

In accordance with provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is,—

1. A supply system having a plurality of supply lines, means for collectively and individually measuring the supply of said lines and means for automatically comparing said measurements and indicating the results in terms of unbalance of the individual lines.

2. A system of supply comprising a plurality of supply lines for conveying a medium, means for determining the unbalancing of supply in one of said lines comprising means for measuring the quantity of medium supplied by said one line, means for obtaining the average quantity supplied by all of said lines and differential means for comparing said quantities.

3. In combination a plurality of lines for supplying a medium, a meter for measuring the total medium supplied, meters for respectively measuring the medium supplied by each line individually and means for comparing the said individual measurements with the said total measurement in such a manner as to measure any unbalancing of the supply system.

4. A system of supply comprising a plurality of supply lines for conveying a medium, a meter for measuring the medium supplied by all said lines, a meter for measuring the medium supplied by one of said lines, and a differential for comparing the measured quantities in a manner to indicate the direction and extent of any unbalancing of the medium supplied by the said one line.

5. A system of supply comprising a plurality of supply lines for conveying a medium, a meter for measuring the medium supplied by all said lines, a meter for measuring the medium supplied by one of said lines, a differential for comparing said measured quantities to indicate the direction and extent of any unbalancing of the medium supplied by said one line, and an attachment for indicating the maximum demand of such unbalancing.

6. In combination a multiple line system for transferring electric energy, a meter connected to measure the total energy supplied, meters connected to measure the energy supplied by each line separately, differential instruments connected between each single line meter and the totalizing meter in such a way as to measure in terms of maximum demand the direction and extent of any unbalancing of the energy supplied by said lines.

7. In combination, a polyphase line for conveying alternating current energy, a metering system therefor, comprising a polyphase meter connected to measure the total energy supplied, single phase meters connected to measure the energy supplied by each phase, and differential means for comparing the single phase measurements with the polyphase measurements so as to indicate in terms of maximum demand the direction and extent of any unbalancing of the energy transferred by said polyphase line.

8. In a metering system for a polyphase alternating current transmission line, a polyphase meter connected to measure the total wattless energy supplied thereby, single phase meters connected to measure the wattless energy supplied by each phase separately, and differential means between each single phase meter and the polyphase meter for indicating in terms of maximum demand the direction and extent of any unbalancing in the wattless energy supplied by said polyphase lines.

9. In a metering system for polyphase electric circuits, means for determining unbalanced conditions comprising means for measuring the total supply of the quantity to be studied, means for measuring the quantity supplied by each line individually and means for continuously and automatically comparing the individual measurements with the total measurement.

In witness whereof, I have hereunto set my hand this fourth day of March, 1922.

VLADIMIR KARAPETOFF.